Oct. 23, 1962  R. H. DICKSON ET AL  3,059,587
DRAG LINE CONVEYOR SYSTEM
Filed Jan. 27, 1960  5 Sheets-Sheet 1
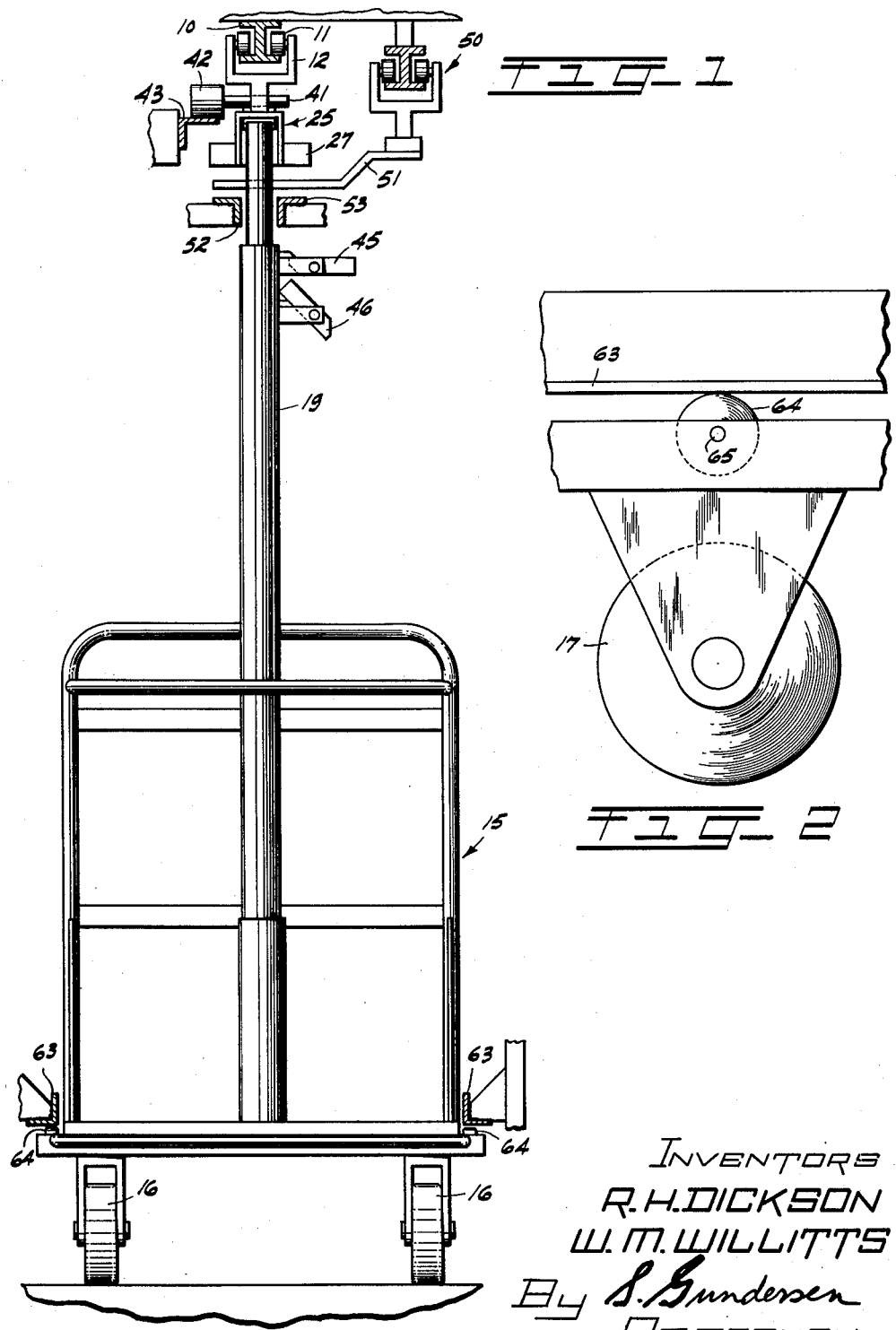
INVENTORS
R. H. DICKSON
W. M. WILLITTS
By S. Gundersen
ATTORNEY

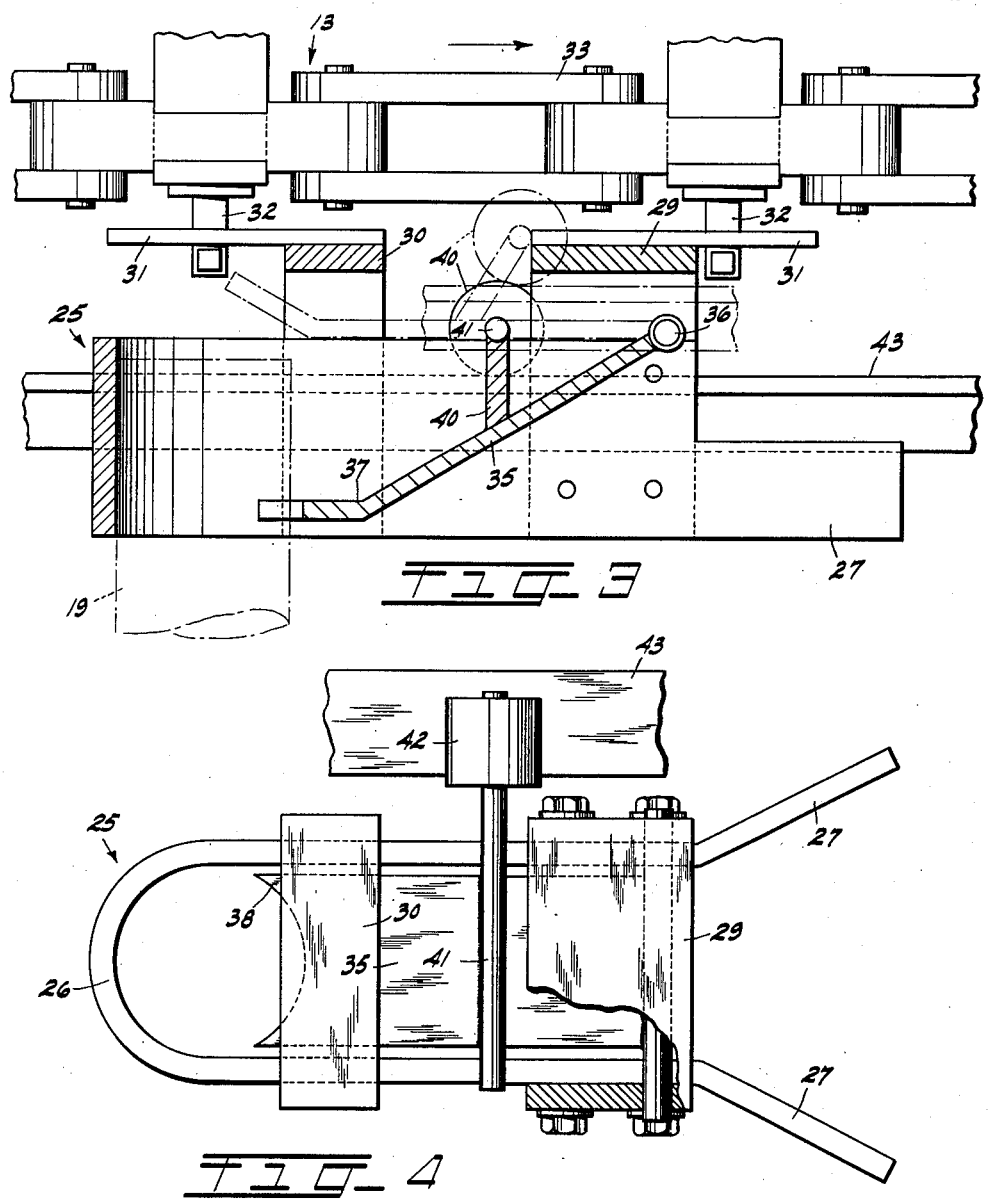

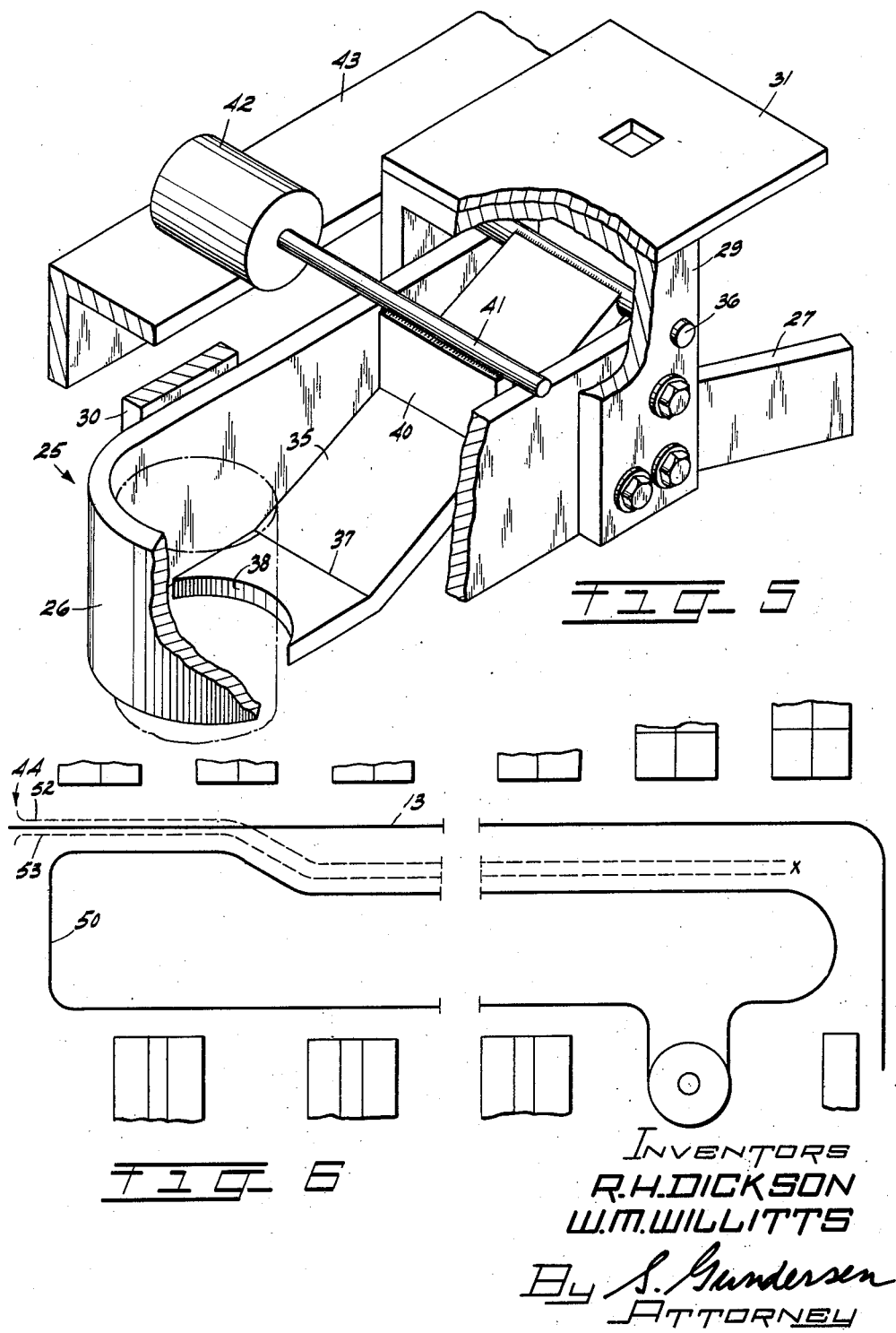

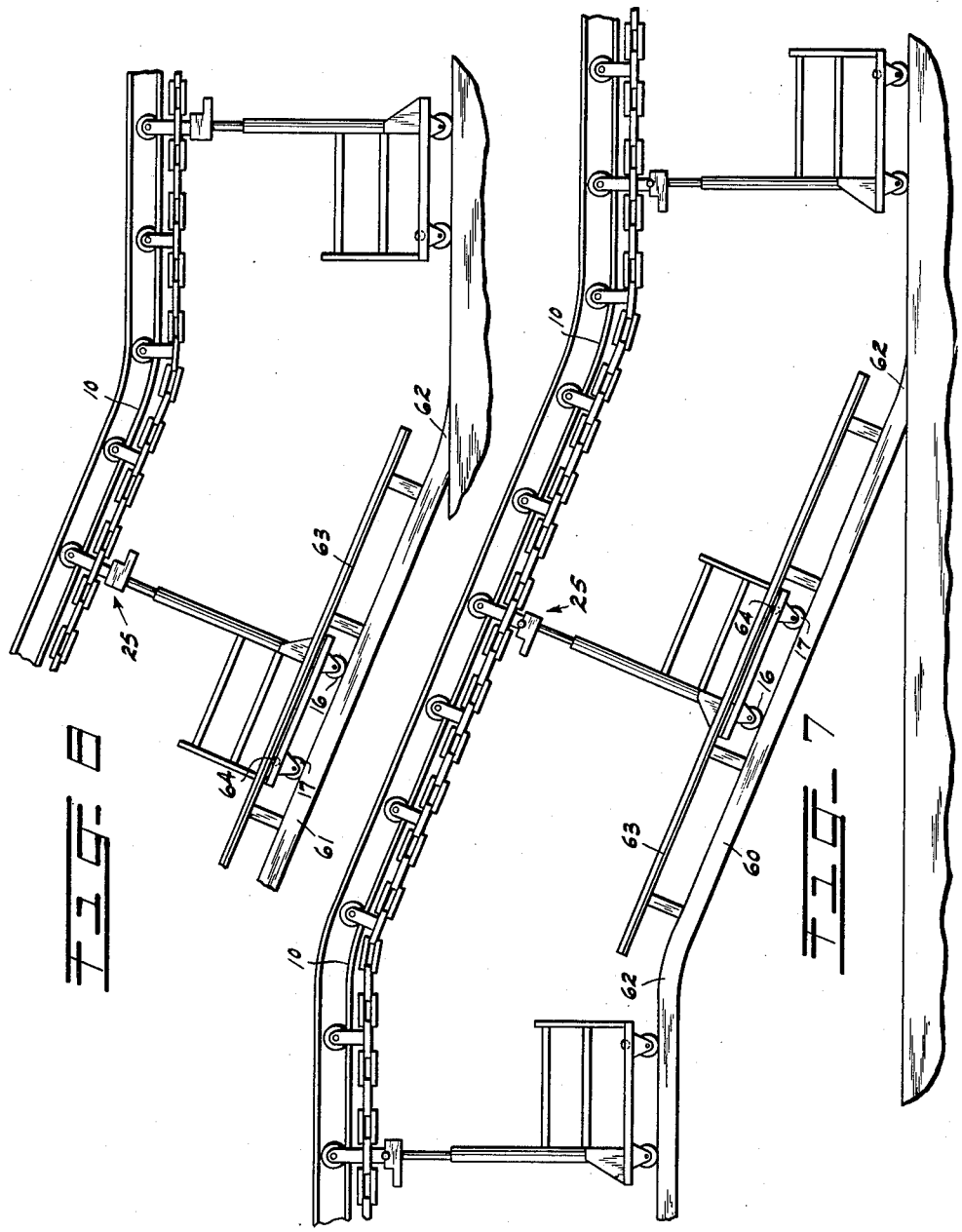

Oct. 23, 1962  R. H. DICKSON ET AL  3,059,587
DRAG LINE CONVEYOR SYSTEM
Filed Jan. 27, 1960   5 Sheets-Sheet 5
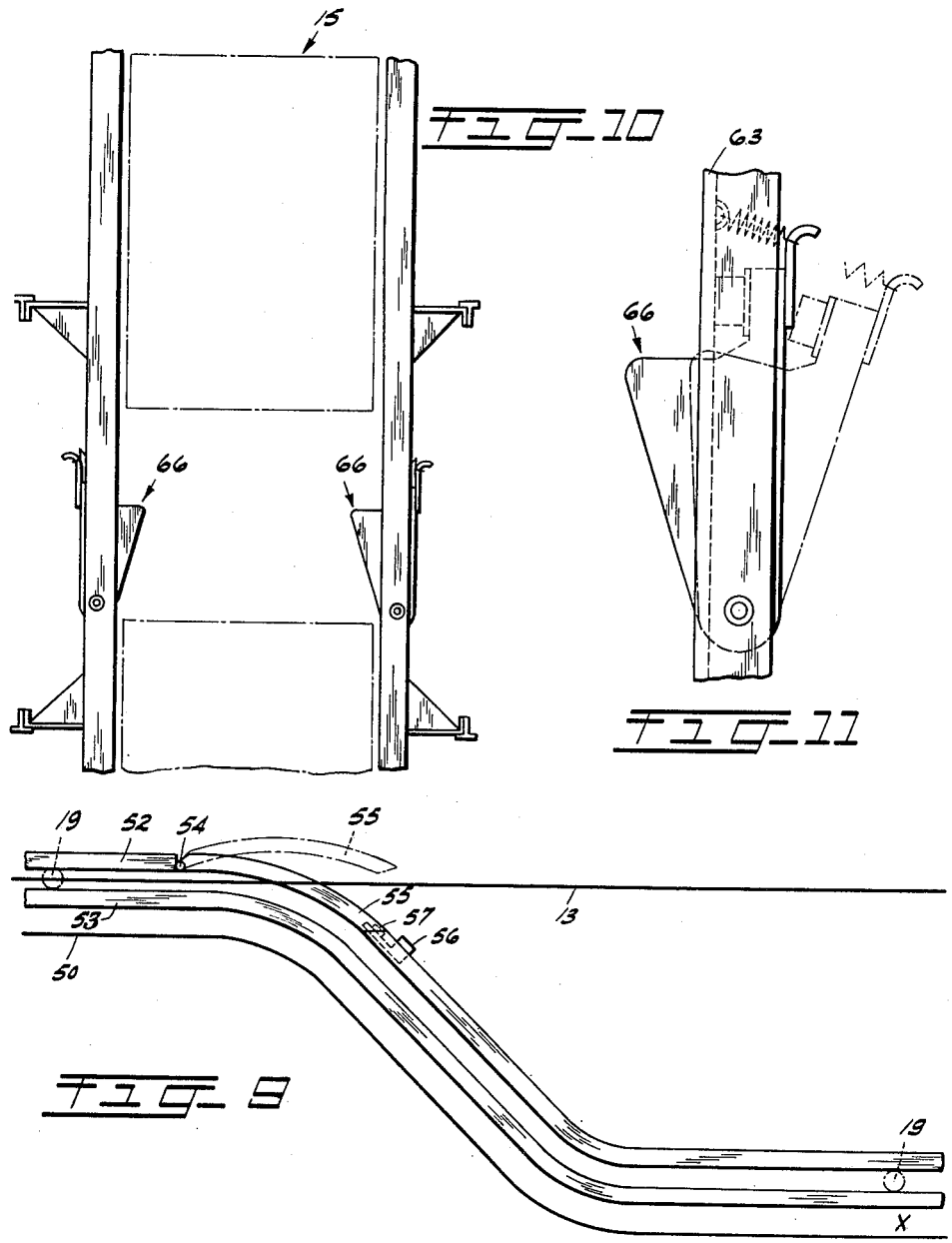
INVENTORS
R.H. DICKSON
W.M. WILLITTS
By L. Gundersen
ATTORNEY United States Patent Office 3,059,587
Patented Oct. 23, 1962

3,059,587
DRAG LINE CONVEYOR SYSTEM
Robert H. Dickson, Groveland, and William M. Willitts, Andover, Mass., assignors to Western Electric Company, Incorporated, New York, N.Y., a corporation of New York
Filed Jan. 27, 1960, Ser. No. 5,052
6 Claims. (Cl. 104—88)

This invention relates to conveyor systems and particularly to an improved overhead chain type drag line conveyor system wherein trucks are transported automatically to predetermined areas.

With the widespread use of conveyor systems in warehouses, factories, assembly plants, etc., it is apparent that complete automatic movement of the trucks to any area is highly desirable. However, several problems have existed heretofore which prevented such automatic operation. In prior systems, it was necessary either to stop the conveyor or manually pull a chain, lever, or the like associated with the conveyor or truck in order to uncouple the truck from the conveyor. Also, with the use of inclined ramps interconnecting various floor levels, the systems lacked suitable stabilizing mechanisms for insuring a continuous locking of the trucks with the conveyors during their movement along the ramps.

The principal object of this invention is the automatic movement of trucks of such systems to predetermined areas.

Another object of this invention is the automatic engagement and disengagement of trucks from the drag line at preselected stations.

A further object of this invention is that of holding the truck in locking engagement with the drag line during its descent and ascent along an inclined ramp where the truck has a tendency to tip or run away.

In accordance with the general features of the invention, a main overhead drag line conveyor, having automatic mast engaging couplings thereon, is utilized to move rigid masted trucks to preselected transfer stations for further removal to predetermined areas. Each truck is equipped with actuators for selectively controlling the automatic removal of the truck from the main drag line at the selected transfer stations. At the transfer stations auxiliary conveyors are set in motion responsive to the condition of the actuators, the auxiliary conveyors having mast contacting means thereon for engaging the mast and removing the truck from the main conveyor and transporting it to the predetermined area.

In a preferred embodiment, the mast coupling mechanisms connected to the main conveyor have a substantially U-shaped member with a movable latch extending between the open ends of the member so as to provide an opening therein for the truck mast. As the truck approaches a transfer station, for removal from the main conveyor, an extension on the latch engages and travels along a cam rail adjacent the main conveyor. The rail gradually inclines at the transfer station and as the extension follows the rail incline, the latch automatically is lifted upwardly and over the top of the mast to unblock the mast and thereby provide a free decoupling path of movement for the mast. A pusher arm on the auxiliary conveyor travelling at a faster rate than the main conveyor engages the mast to decouple the truck from the main drag line and remove it to the predetermined area.

An important feature of this invention is the provision of stabilizers on the truck frame that ride under side rails of inclined ramps interconnecting various floor levels in order to prevent the truck from tipping during its movement along the ramps.

Other objects and advantages will be apparent from the following detailed description when considered in conjunction with the accompanying drawing, wherein:

FIG. 1 is a front plan view of the invention at a transfer station;
FIG. 2 is an enlarged side view of one of the stabilizing rollers;
FIG. 3 is a side view of the coupling mechanism connected to the main conveyor;
FIG. 4 is a plan view of the coupling mechanism;
FIG. 5 is an isometric view of the coupling mechanism in its mast blocking position as it approaches the transfer station;
FIG. 6 is a schematic view of the main and auxiliary conveyors at a transfer station;
FIG. 7 is a side elevational view of the truck being transported on the "up" ramp;
FIG. 8 is a side elevational view of the truck being transported on the "down" ramp;
FIG. 9 is a plan view of the auxiliary guide mast gate;
FIG. 10 is a plan view of the stop back devices on the "up" ramp;
FIG. 11 is an enlarged view of the stop back device shown in FIG. 10.

With respect to FIG. 1, the invention is illustrated as being incorporated in a main conveyor system which consists of an I beam 10 providing a track for rollers 11 supporting a trolley bracket 12 of a continuously movable overhead main chain drag line 13, hereinafter called main conveyor, powered by a conventional drive mechanism (not shown). The trucks 15, having swivel type front wheels 16 and rigid rear wheels 17, are equipped with rigid upright masts 19 on the truck front.

A coupling mechanism, as seen in (FIGS. 3, 4 and 5), is utilized to connect the mast 19 with the main line and consists of a substantially U-shaped member 25 for receiving the mast and has a closed end 26 and free open ends 27 for guiding the mast therein. The member 25 is supported on the main line by brackets 29 and 30 mounted on the member near its open and closed ends respectively, and plates 31 connect the brackets to receiving elements 32 of the chain link 33.

A latch 35 is welded at one end to a pivotal pin 36 extending transversely above the member 25 and supported in the bracket 29. The other end of the latch extends downwardly between the arms toward the closed end 26 a sufficient distance so as to provide an opening therebetween for the mast 19. The end portion 36 of the latch is angularly bent at 37 and in perpendicular relationship with the lateral surface of the mast. The surface 38 of the end portion 36 is arcuately formed to receive and partially envelop the mast so as to block the mast and hold it in a rigid position when the truck is being transported down a ramp 61, hereinafter described, due to the tendency of the truck to run away during its descent. In other words, the latch inhibits any tendency of the mast to pull out of the coupling while moving down the ramp.

An upright element 40 is mounted on the external surface of the latch 35 and extends upwardly therefrom to and level with the upper portion of the member 25. A shaft 41 is mounted onto the element 40 and extends transversely across the upper portion of the arms 27 thereby holding the latch in its blocking position. An outrigger wheel 42 is provided at one end on the shaft 41 to ride along an angle iron cam rail 43 adjacent the main line as it approaches a transfer station 44 for removal of the truck from the main conveyor. As the truck approaches the transfer station, the cam rail 43 is gradually curved upwardly and as the wheel 42 moves therealong it rises and lifts the latch upwardly to its unblocked position thereby providing a free path for removal of the mast from the member 25.

Each truck is equipped with actuators commonly referred to as flippers 45 and 46 for actuating an auxiliary conveyor 50 to remove the truck from the path of the main conveyor and transport it to a predetermined area X (FIGS. 6 and 9). As seen in FIG. 1, flipper 45 is in its preset extending position so that it can engage an electrical switch (not shown) located in its path near the transfer station 44. Thus, as the truck approaches the transfer station and the coupling mechanism is unlatched opening a decoupling path therefor, flipper 45 strikes the switch to start the auxiliary conveyor 50. The auxiliary conveyor travels at a faster speed than the main conveyor and one of several bar attachments 51, mounted on the auxiliary, extends in the travelled path of the main conveyor to engage the mast 19 from behind and remove it from the main conveyor's path. The bar attachments are sufficiently spaced from each other and the auxiliary conveyor is cycled such that none of the bar attachments is in the path of the main conveyor to interfere with the movement of the trucks.

The truck is readily guided between a pair of auxiliary mast guides 52 and 53 leading from the main conveyor, as seen in FIGS. 6 and 9, a short section of the auxiliary mast guide 52 being hinged at 54 to form a gate 55. The gate is of the conventional automatic door closer type and disposed in a normal unlocked position against pin 57. Simultaneously with the activation of the auxiliary conveyor 50, the flipper 45 also contacts a switch (not shown) energizing a solenoid 56 to activate pin 57 to lock the gate 55 thereby enabling the mast to pass between the mast guides 52 and 53 to the predetermined area X.

In the event the truck is destined to by-pass the transfer station 44, that is, the flipper 45 is not in its extended contacting position and solenoid 56 is not energized to activate pin 57, the pressure of the mast 19 against the gate 55 opens the gate and the truck passes therethrough to a position in the path of the main conveyor. After the truck passes through the gate, it automatically returns under the force of a spring (not shown) to its normal unlocked position against pin 57.

The open arms 27 of the U member 25 guide the mast therebetween and as the main conveyor continues its forward movement, the bottom surface of the latch 35 engages the mast causing the latch to move upwardly as the mast slides therealong until it reaches the engaging end 38 resulting in the latch moving downwardly by gravity to its normal blocking position to couple the mast within the closed end 26 of the member 25. The truck is transported along the path of the main conveyor to the next transfer station.

Ramps 60 and 61, as seen in FIG. 7, are utilized to interconnect upper and lower level floor areas and provide a surface for movement of the trucks therealong. At the ends of the ramps, the floor is curved at 62 to correspond to the radius of the main conveyor's I beam track 10 thereby effecting a smooth transition of the truck to and from the ramps. A pair of supported elevated side rails 63 are provided on each ramp and extend longitudinally in parallel spaced relationship with respect to the ramp. As the truck approaches the ramp, stabilizing rollers 64, rotatable on axles 65, are equipped on each side of the truck near its rear end to ride under the side rails 63, which in turn, keep all the four wheels on the truck in contact with the ramp thereby holding the truck against any tendency to tip forward. It is to be understood that this invention is not limited to stabilizing rollers as any stabilizing cam type general arrangement may be utilized.

Standard anti-run-away devices (not shown) may be provided on the down ramp 61 to stop the forward movement of the truck in the event the main conveyor chain 33 breaks. However, the side rails 63 on the up ramp 60 are equipped with a plurality of spring loaded back stops 66. The stops 66 are pushed into the channels of the rail by the truck as it passes by and subsequently snaps back into position immediately after the truck passes. Thus, in case the chain breaks or the mast is released accidently from the coupling mechanism, the truck rolls backwards only a few feet until it is caught by the back stops 66.

Thus, although the invention has been described with a certain degree of particularity, it is understood that the present disclosure has been made only by way of example and that numerous changes in the details of construction and the combination of arrangements of parts may be resorted to without departing from the spirit and scope of the invention as hereinafter claimed.

What is claimed is:

1. In a material handling system having a continuously movable overhead main conveyor and a rigid masted floor truck adapted to be transported by the main conveyor, a coupling mechanism for securing the truck to the main conveyor, which comprises a substantially U-shaped member for receiving a portion of the mast, the member having a closed end and free open end arms for guiding the mast portion therein, means for rigidly holding the member to the conveyor, a latch connected to the U-shaped member and extending between the arms to block the mast portion receiving opening in the member to prevent removal of the mast portion therefrom, and means for removing the latch from its blocking position at predetermined locations, thereby providing a free path for removal of the mast portion from the member.

2. In a material handing system having a continuously movable overhead main conveyor, a cam rail, and a rigid masted floor truck adapted to be transported by the main conveyor, a coupling mechanism for securing the truck to the main conveyor, which comprises a substantially U-shaped member for receiving a portion of the mast, the member having a closed end and free open end arms for guiding the mast portion therein, means for rigidly holding the member to the main conveyor, a movable latch connected to the holding means near the open ends and extending toward the closed end a sufficient distance so as to provide an opening therebetween for the mast portion, a latch lifting element on the latch for riding on the cam rail, and inclined portions on the rail at preselected locations causing the element to lift the latch upwardly and over the top of the mast to its unblocked position, thereby providing a free path for removal of the truck from the coupling.

3. The combination set forth and claimed in claim 2 wherein the element extends transversely over and rests on at least one arm of the member to hold the latch in its normal blocking position with the mast, and a roller on the element for riding on the cam rail.

4. The combination set forth and claimed in claim 2 wherein the latch is pivotally connected to the holding means near the open ends of the member and extends from its pivotal connection downwardly between the arms causing the latch to move upwardly upon its engagement with the top of the mast to be coupled thereto, the mast sliding therealong until it reaches the end of the latch resulting in the latch moving downwardly by gravity to its normal blocking position to block the mast within the closed end of the member.

5. The combination set forth and claimed in claim 2 which includes an auxiliary conveyor for removing trucks from the main conveyor to a predetermined area, a portion of the auxiliary conveyor being adjacent the main conveyor, gate means connected to the main conveyor, means on the truck for selectively starting the auxiliary conveyor to run at a faster speed than the main conveyor, and a pusher arm mounted on the auxiliary conveyor and extending laterally in the path of the main conveyor for engagement with the mast, when the latch is in the unblocked position, causing the truck to be automatically removed from the path of the main conveyor through the gate means and driven to the preselected area.

6. In a material handling system for automatically moving trucks to predetermined areas having a main movable overhead drag conveyor, successive transfer stations associated with the main conveyor, rigid masted trucks transported by the main conveyor, drag coupling devices on the main conveyor having means for locking a portion of the truck masts therein and actuators on the masts for signalling the transfer station at which trucks are to be disconnected from the main line and transferred to predetermined areas, the combination of, means at each of the transfer stations for automatically releasing the coupling locking means, auxiliary conveyors at each end of the transfer stations operable at a faster speed than the main conveyor, a control device for each of the transfer stations responsive to the setting of the actuators on the trucks for actuating the auxiliary conveyors, and each auxiliary conveyor having means operable for removing preselected trucks to predetermined areas which includes, an auxiliary mast guide rail leading away from the main conveyor, and a pusher member attached to the auxiliary conveyor extending and passing into the path of a truck being advanced by the main conveyor to engage the mast from behind and move the truck through the auxiliary guide rail to the predetermined area.

References Cited in the file of this patent
UNITED STATES PATENTS

| | | |
|---|---|---|
| 715,791 | Happe | Dec. 16, 1902 |
| 737,409 | Jackman | Aug. 25, 1903 |
| 761,484 | Hetzel | May 31, 1904 |
| 2,949,862 | Klamp | Aug. 23, 1960 |